United States Patent
Wirth

(10) Patent No.: US 7,150,343 B2
(45) Date of Patent: Dec. 19, 2006

(54) SHOE BRAKE ASSEMBLY, IN PARTICULAR FOR RAIL VEHICLES

(75) Inventor: Xaver Wirth, Ismaning (DE)

(73) Assignee: Knorr-Bremse Systeme fur Schienenfahrzeuge GmbH, Munich (DE)

( * ) Notice: Subject to any disclaimer, the term of this patent is extended or adjusted under 35 U.S.C. 154(b) by 0 days.

(21) Appl. No.: 10/487,144

(22) PCT Filed: Aug. 12, 2002

(86) PCT No.: PCT/EP02/09032

§ 371 (c)(1),
(2), (4) Date: Aug. 3, 2004

(87) PCT Pub. No.: WO03/018381

PCT Pub. Date: Mar. 6, 2003

(65) Prior Publication Data

US 2005/0000764 A1    Jan. 6, 2005

(30) Foreign Application Priority Data

Aug. 23, 2001   (DE)   ................................. 101 41 253

(51) Int. Cl.
   *F16D 51/00*    (2006.01)
(52) U.S. Cl. .................... 188/76; 188/52; 188/153 A; 188/42
(58) Field of Classification Search ........... 188/2 R, 188/3 R, 3 H, 9, 10, 11, 12, 13, 14, 15, 29, 188/33, 34, 38, 38.5, 39, 41, 42, 47, 49, 51, 188/57, 76, 52, 58, 114, 153 A
See application file for complete search history.

(56) References Cited

U.S. PATENT DOCUMENTS

| | | | | |
|---|---|---|---|---|
| 836,084 A | * | 11/1906 | Bradley | ...................... 188/336 |
| 855,271 A | * | 5/1907 | Bainbridge | ................... 188/76 |
| 1,883,732 A | * | 10/1932 | Hahn | .......................... 188/2 A |
| 1,900,155 A | * | 3/1933 | Bragg et al. | .................. 188/10 |
| 2,354,309 A | | 7/1944 | Frede | |
| 2,582,755 A | | 1/1952 | Kenny | |
| 4,136,760 A | * | 1/1979 | Sander | ....................... 188/198 |
| 4,280,596 A | * | 7/1981 | Miller | .......................... 188/52 |
| 6,494,301 B1 | | 12/2002 | Wirth | |

FOREIGN PATENT DOCUMENTS

| | | | |
|---|---|---|---|
| CH | 119108 | * | 6/1926 |
| DE | 119108 | | 6/1926 |
| DE | 805894 | | 5/1951 |
| DE | 198 40 065 A1 | | 3/2000 |

(Continued)

OTHER PUBLICATIONS

Bartlechner Manfred et al, Abstract of EP0665154 dated Aug. 2, 1995.

(Continued)

*Primary Examiner*—Devon Kramer
(74) *Attorney, Agent, or Firm*—Barnes & Thornburg LLP

(57) ABSTRACT

A shoe brake assembly for a rail vehicle including a bogie connected with the rail vehicle. The assembly also includes a wheel having a wheel web and radially inward-facing surfaces on opposite sides of the wheel web. Also included are at least two brake pads adjacent respective radially inward-facing surfaces of the wheel and a pendulum suspension arrangement connecting the at least two brake pads to the bogie. The assembly further includes an operating device configured to move the at least two brake pads via the pendulum suspension essentially radially against respective radially inward-facing surfaces of the wheel.

16 Claims, 8 Drawing Sheets

FOREIGN PATENT DOCUMENTS

| | | |
|---|---|---|
| EP | 0 665 154 B1 | 12/1994 |
| GB | 686720 | 1/1953 |
| GB | 958104 | 5/1964 |
| RU | 2 120 875 C1 | 10/1998 |
| RU | 2 202 488 C2 | 4/2002 |

OTHER PUBLICATIONS

Bartlechner Manfred et al,, Abstract of DE 4403000 C and EP 665154 B.

* cited by examiner

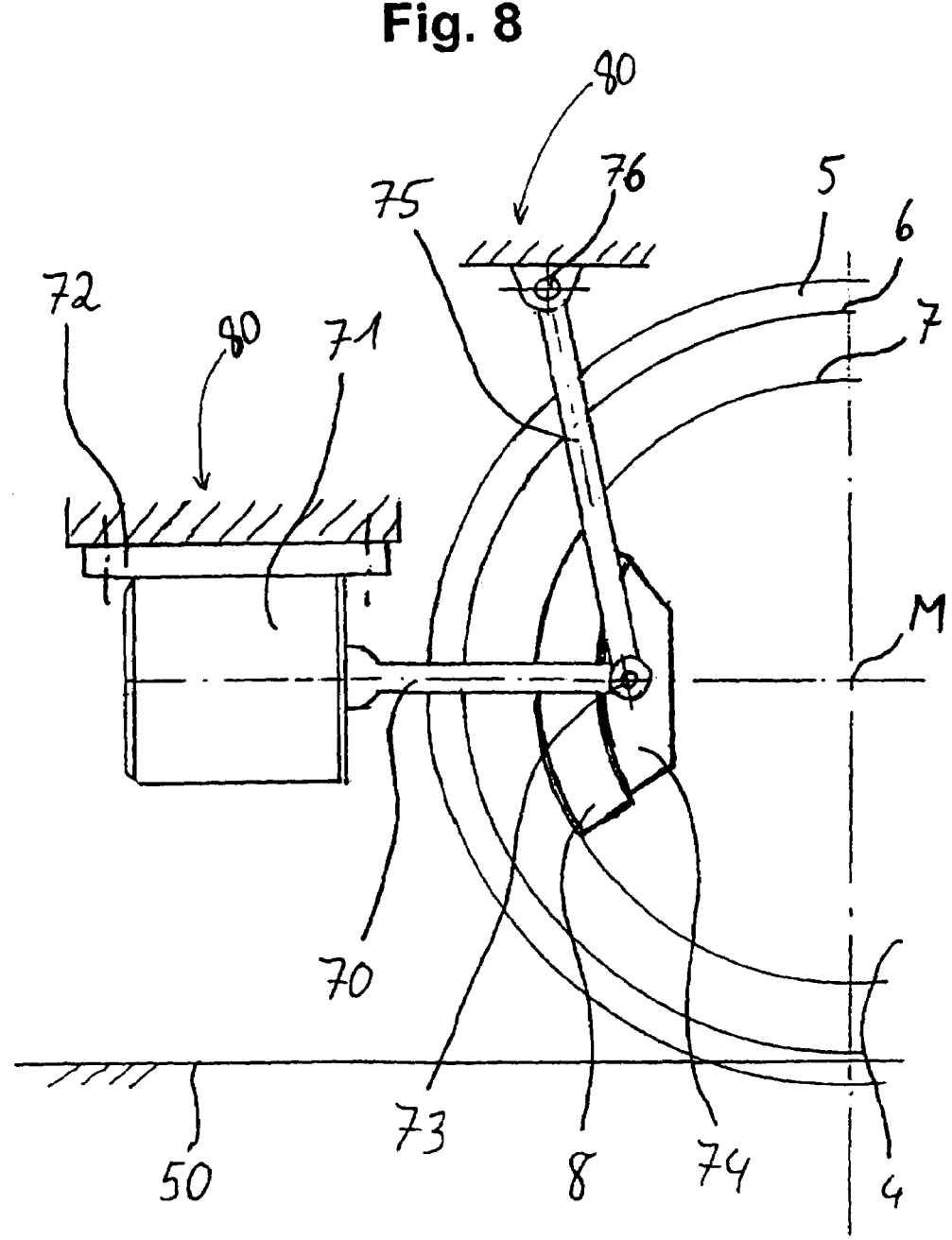

SHOE BRAKE ASSEMBLY, IN PARTICULAR FOR RAIL VEHICLES

BACKGROUND

The present disclosure relates to a shoe brake assembly for rail vehicles.

From European Patent Document EP 0 665 154 B1, a shoe brake assembly for a rail vehicle is known. The assembly comprises a brake pad which can be pressed against the tread of a rail wheel by an application device. For operating the shoe brake assembly, a suspension system is provided which permits the brake pad to carry out a certain lateral movement along with the wheels. By corresponding pressure or tension members of the suspension, the brake pads are pressed against the wheel treads for generating a frictional force. The resulting high stressing of the wheel treads is disadvantageous because the service life of the wheel is shortened and a roughening or corrugation of the wheel tread is produced. The roughening or corrugation of the wheel tread leads to a high running noise during the rolling operation of the wheel, which is why, in the case of modern rail vehicles, separate disk brakes are frequently provided which, however, are comparatively expensive. In addition, the one-sided braking load of the wheel results in high thermal stress.

In order to address those disadvantages, an elastic brake body is disclosed in German Patent Document DE 19840065, in the case of which a bearing body is provided with recesses into which the friction material elements are inserted. These friction material elements form a joint friction surface and are carried in an elastic manner. Although these elastic brake bodies, to a certain extent, permit a compressing and rebounding of the friction material elements when these are pressed onto the tread of the rail wheel and thereby avoid the formation of hot spots, a roughening and corrugation on the tread is not completely avoided.

SUMMARY

The present disclosure relates to a shoe brake assembly for rail vehicles. The shoe brake assembly includes a bogie connected with the rail vehicle. Also included is a wheel having a wheel web and radially inward-facing surfaces on opposite sides of the wheel web. The assembly further includes at least two brake pads adjacent respective radially inward-facing surfaces of the wheel and a pendulum suspension arrangement connecting the at least two brake pads to the bogie. The assembly also includes an operating device configured to move the at least two brake pads via the pendulum suspension essentially radially against respective radially inward-facing surfaces of the wheel.

If, in the case of the shoe brake assembly, for generating a braking force, at least one brake pad can be placed against a surface of the wheel facing radially toward the interior, the tread of the wheel is not stressed by this brake pad. As a result, on the one hand, temperature-caused tensions are avoided during the braking operation and, on the other hand, the above-mentioned roughening of the wheel tread by the brake pad is also avoided. The development of noise during the rolling operation of the wheel can thereby be reduced. In addition, by the arrangement of the brake pad on an inward-facing surface of the wheel, the contact pattern between the brake pad and the wheel tread can be improved.

According to an embodiment of the present disclosure, the at least one brake pad can be moved by way of a pendulum suspension essentially radially toward the outside against a surface of the wheel. The pendulum suspension permits a compensation of vertical movements between the bogie and the wheel, which are generated, for example, by the loading or unloading of the vehicle.

If at least two brake pads are provided, which are applied to the wheel at opposite sides of a wheel web, no momentum is generated at the wheel web as a result of the introduction of force since, because of the one-sided application of forces, the wheel web is only under tension. For an effective introduction of force, each brake pad is liked to or connected with two tension bows or bars which are mutually connected in an articulated manner by way of transverse lugs and can thus be displaced with respect to one another in the manner of a parallelogram. This type of suspension permits the adapting of the position of the brake pad to the frictional surface of the wheel during the compressing or rebounding of the wheel. In this case, the tension bow can be connected with the bogie in an articulated manner by way of one or several holding lugs.

According to another embodiment, a holding lug is linked to a tension bow in the direct proximity of the brake pad. As a result, the frictional force of the pad can be diverted at the site of its origin directly by way of the holding lug, in which case the stiffer linkage of the brake pad results in lower braking noises. In this case, the holding lug adjacent to the brake pad can be linked to a single tension bow as well as to one of two tension bows. In addition, the holding lug can be disposed on a pressure piece which acts upon the brake pad during the braking operation.

If a second brake pad is provided at the suspension of the brake pad assembly, the brake pad can be moved against the tread of the wheel and a particularly high braking force can be generated. This double pad arrangement, with brake pads situated on the outside and inside, is suitable for heavy rail vehicles, such as locomotives. As a result of the two-sided arrangement of brake pads, a more uniform warming-up of the wheel is also caused.

If the shoe brake assembly comprises two brake pads, which can be placed on one radially inward-facing surface of two adjacent wheels respectively, a caliper can be provided between the wheels for generating the force.

According to another embodiment of the present disclosure, the surface of the wheel and the opposite surface of the brake pad are constructed to be slightly sloped toward a wheel web. The brake pad is thus pressed to the interior toward the wheel web as a result of the slope of the braking surface during a movement radially toward the outside. By generating a braking force at a section of the wheel web as well as at the radially inward-facing surface, thermal tensions can be reduced between the wheel flange and the wheel web because a more uniform warming-up of the wheel takes place. The slope of the braking surface may also bean that the brake pads are centered and a clear assignment of the wheel surface and the frictional surface of the pad exists even when axle displacements occur. In this case, the slope is, for example, in a range between 3 and 30°.

Other aspects of the present disclosure will become apparent from the following descriptions when considered in conjunction with the accompanying drawings.

BRIEF DESCRIPTION OF THE DRAWINGS

FIG. 8 is a lateral view of a shoe brake assembly, according to another embodiment of the present disclosure.

DETAILED DESCRIPTION

Figure 1:
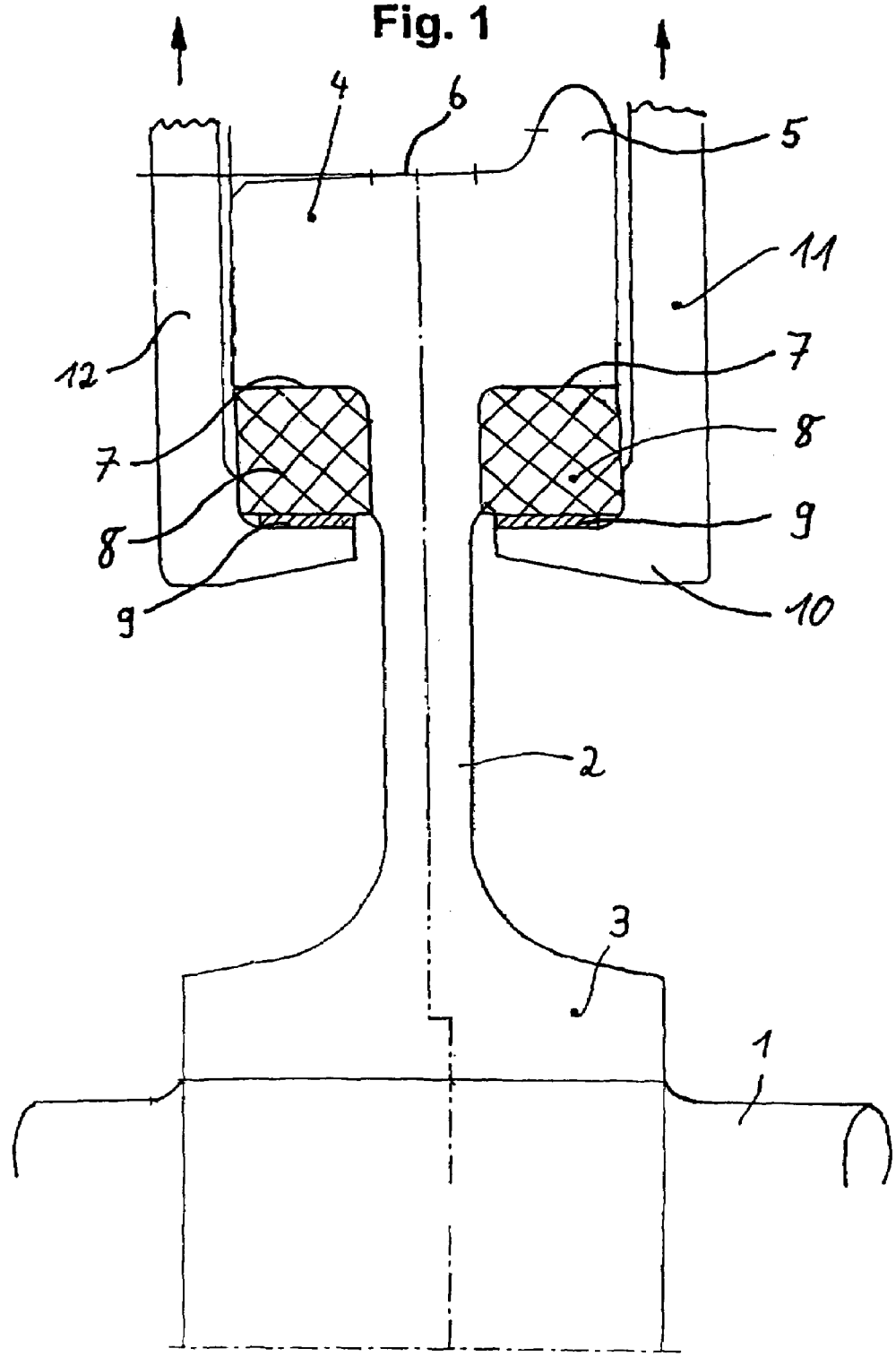
FIG. 1 is a partial sectional frontal view of the shoe brake assembly, according to an embodiment of the present disclosure.
Figure 2:
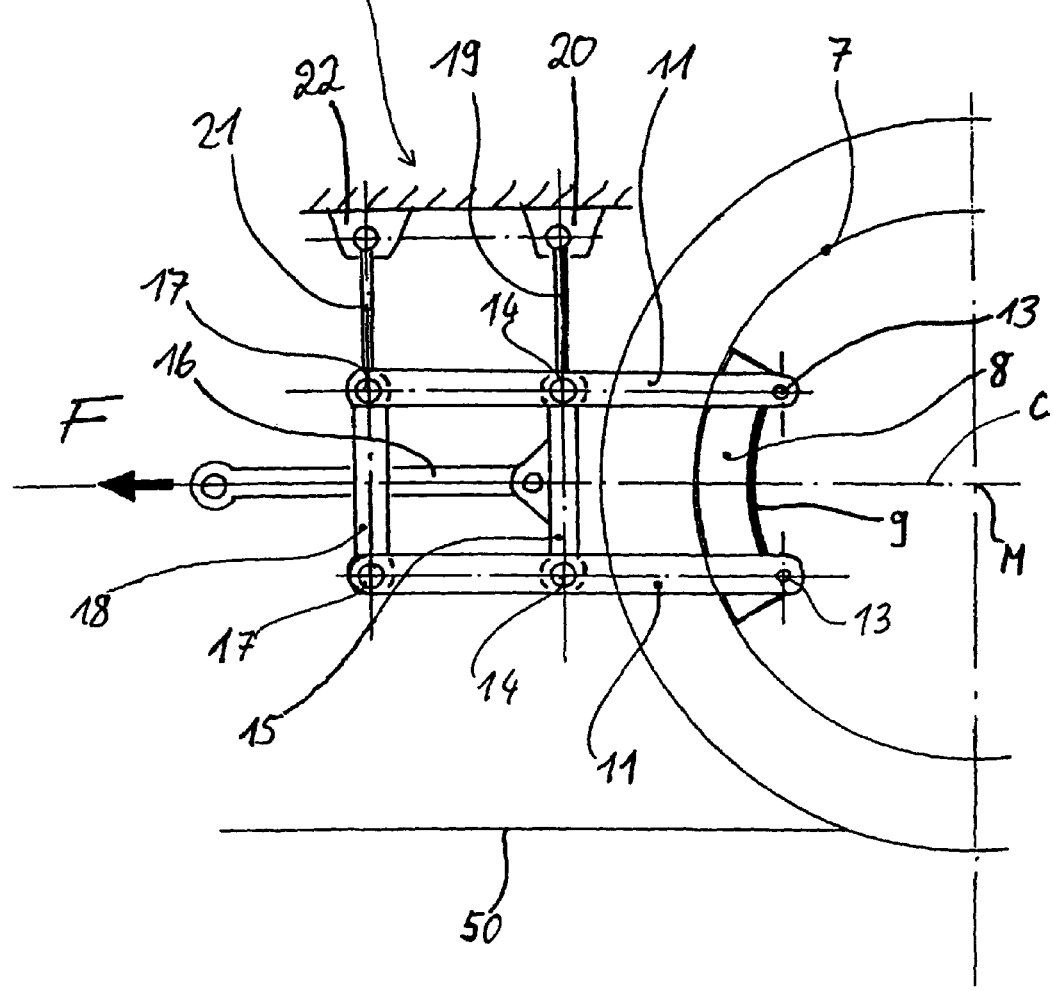
FIG. 2 is a lateral view of the shoe brake assembly of FIG. 1.
Figure 3:
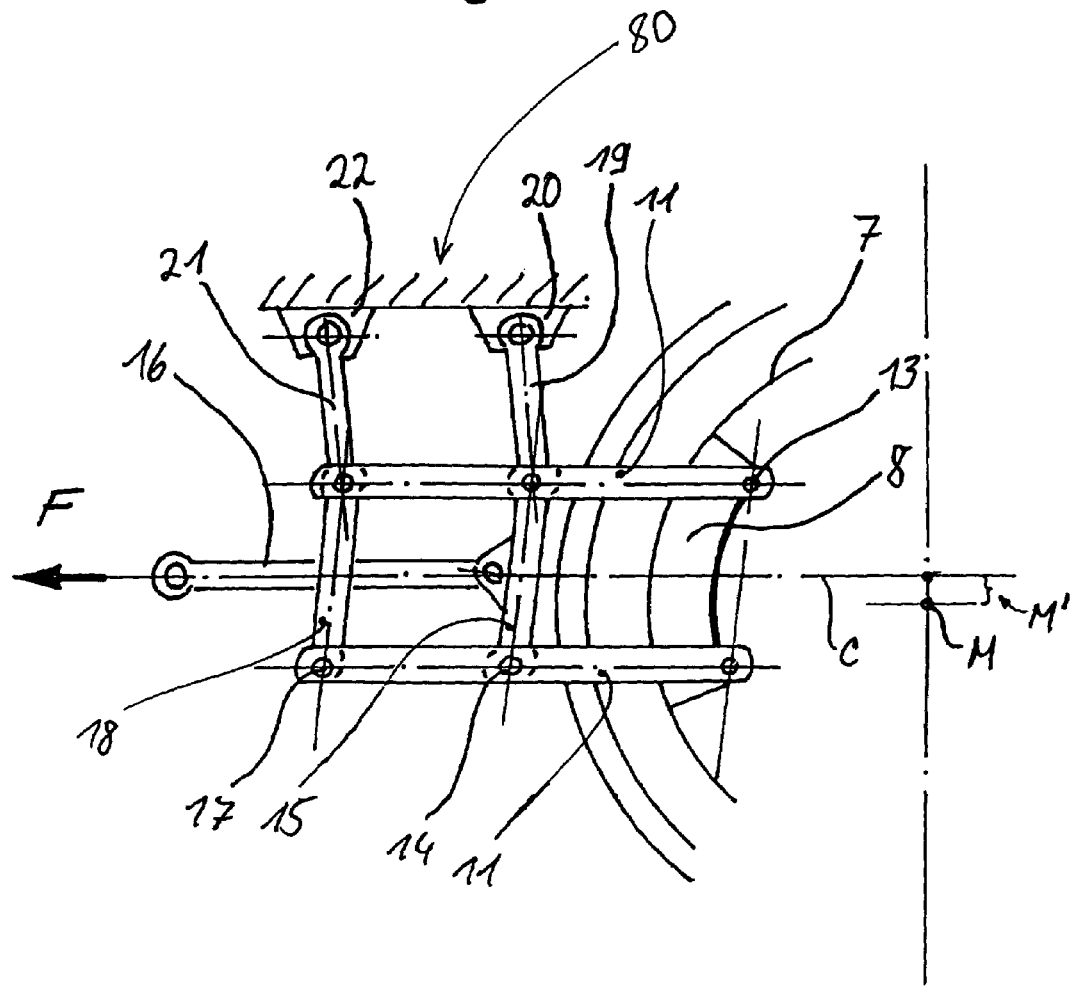
FIG. 3 is a lateral view of the shoe brake assembly of FIG. 1 when the vehicle is heavily loaded.

The shoe brake assembly illustrated in FIGS. 1 to 3 comprises a wheel 4 which is mounted on an axle 1 of a rail vehicle (not shown). A wheel hub 3 is fixed on the axle 1. A wheel web 2, which, may be thinly constructed, leads into a flange 5 of the wheel 4 and extends away from the wheel hub 3 in a radial direction. On an outward-facing side, a tread 6 is constructed which has a slight diagonal slope with respect to a horizontal line, as shown in FIG. 1. On the radially inward-facing side of the wheel flange 5, surfaces 7 are constructed on both sides of the wheel web 2, against which surfaces 7 a brake pad 8 can be placed. The brake pads 8 are each received on a holder 9 which has a bent construction and is fixed to an arm 10 of a tension bow 11. In FIG. 1, the right brake pad 8 can be operated by a tension bow 11, while the left brake pad 8 can be moved by another tension bow 12, as indicated by the arrows.

A suspension arrangement for the brake pads 8 comprises two tension bows 11 which are each connected at a vertical distance via articulations 13 with the holder 9 of a brake pad 8. In this case, the tension brows 11 are mutually connected via a first transverse lug 15 and a second transverse lug 18. The two articulations or axes 14 of the transverse lug 15 as well as the articulations or axes 17 of the transverse lug 18 form a rectangle, which is why the tension bows 11 can be displaced in a parallelogram-type manner. An operating device, such as a tension rod 16, is mounted on the transverse lug 15 in an articulated manner, via which tension rod 16 an operating force F can be introduced in order to press the brake pads 8 onto the braking surface 7.

The upper tension bow 11 is connected by two holding lugs 19 and 21 with a bogie 80 of the rail vehicle. In this case, the holding lug 19 is mounted in an articulated manner on a suspension 20, and the holding lug 21 is mounted in an articulated manner on a suspension 22. In a loading case as illustrated in FIG. 2, center point M of the wheel 4 is at the same height as center axis C of the tension rod 16, so that, when the force F is introduced, the brake pad 8 is arranged centrically at the wheel 4. In this case, the wheel 4 rolls on a rail 50, which is not shown in detail.

In a loading case illustrated in FIG. 3, the bogie 80 is slightly lowered, for example, because of its higher loading, so that the center point M of the wheel 4 is vertically offset with respect to the axis C of the force F by a distance M'. When the braking force F is introduced, the brake pad can adapt itself to a respective position of the surface 7, the tension bows 11 are displaced via the articulations or axes 14 and 17 in a parallelogram-type manner, so that the brake pad 8 can rest against the surface 7.

For initiating a braking operation, a tension force F may be applied by a caliper, which is not shown. The tension force presses the brake pad 8 onto the surface 7 via the suspension arrangement, in order to generate a desired braking torque. As a result of the introduction of the tension force F in the center of the transverse lug 15, the two tension bows 11 can be mutually displaced when this is required by a change of a slope of the brake pad 8, or in the case of a vertical movement of the wheel 4. As a result of a frictionally engaged prestressing at the articulations 14 and 17, it can be achieved in this case that, after a release of the brake, the slope of the brake pad 8 is maintained and changes only when another angle of slope is defined by a compression change of the wheel 4. The force applied to the brake pad 8 during a braking engagement will then result in an angular change between the tension bows 11 and the transverse lugs 15 and 18, in which case the frictionally engaged prestressing is then overcome.

Sintered plastic, as well as sintered gray cast iron pads, can be used for the brake pad 8. It is also conceivable to use elastic brake pads which are formed of several individual friction material elements which are prestressed toward the braking surface. Concerning the possible construction of the brake pads, reference is made to the disclosure of German Patent Document DE 19840065.

Figure 4:
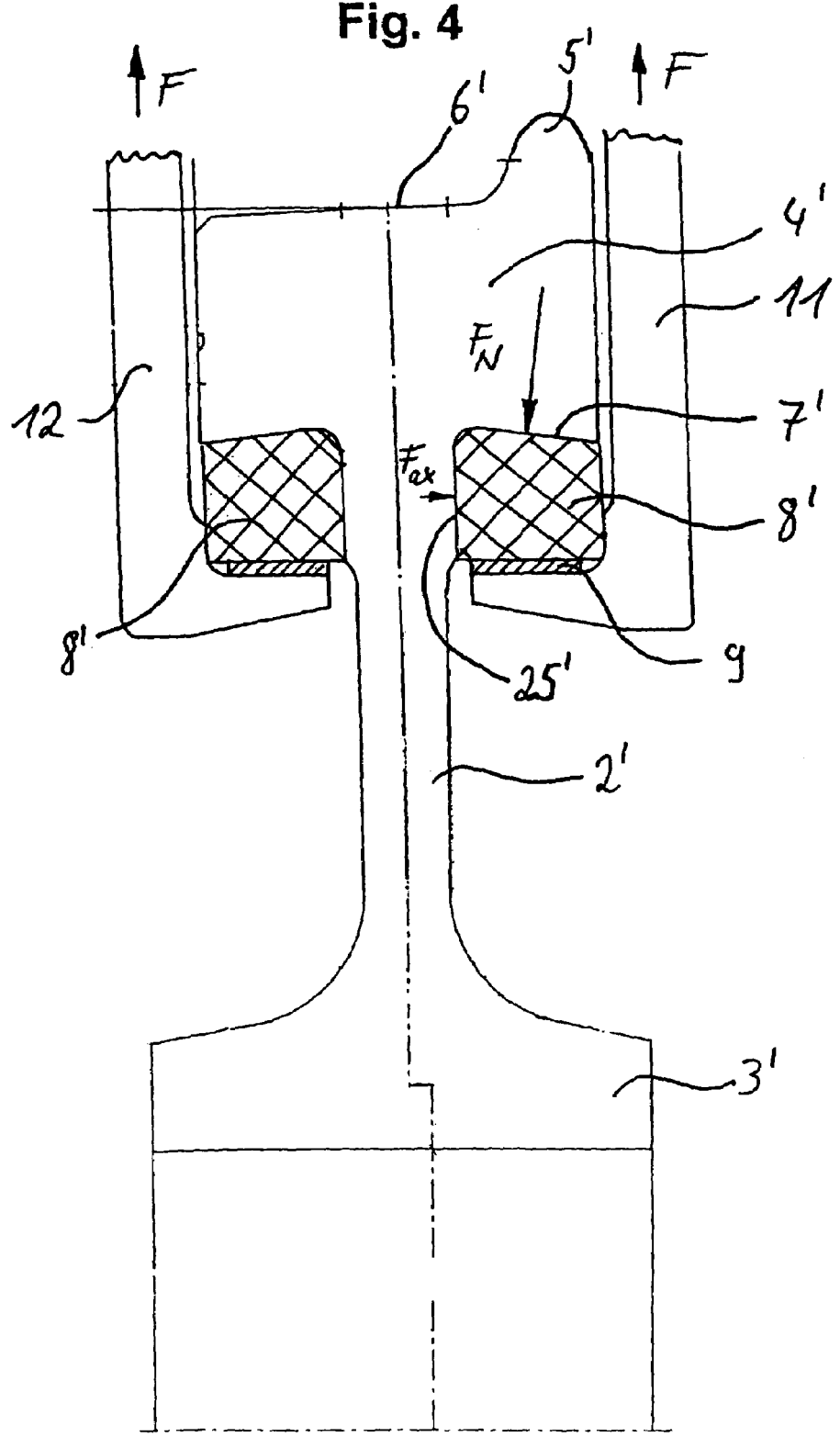
FIG. 4 is a sectional frontal view of a shoe brake assembly, according to another embodiment of the present disclosure.

In the embodiment illustrated in FIG. 4, a brake pad assembly is provided which has slightly modified brake pads 8' held on tension bows 11 and 12 on both sides of the wheel web 2'. The suspension of the brake pads 8' takes place as described in the preceding embodiment.

The brake pads 8' have a friction surface which, like the surface 7' on the wheel flange 5', is constructed to be slightly sloped with respect to the wheel web 2'. When a force F is introduced via the tension bows 11 and 12, a normal force $F_N$ is generated which is slightly sloped with respect to the vertical and presses the brake pad 8' toward the wheel web 2'. As a result, the brake pad 8' rubs not only on the surface 7' but also on a section 25' of the wheel web 2' to which a braking force $F_{ax}$ is applied. Therefore, during a braking operation, section 25' of the wheel web 2' is also heated up, which reduces thermal tensions within the wheel 4'. In addition, as a result of the sloped construction of the surface 7', a centering of the brake pads 8' is caused. Since brake pads 8' are provided on both sides of the wheel web 2', occurring axial forces are compensated.

Figure 5:
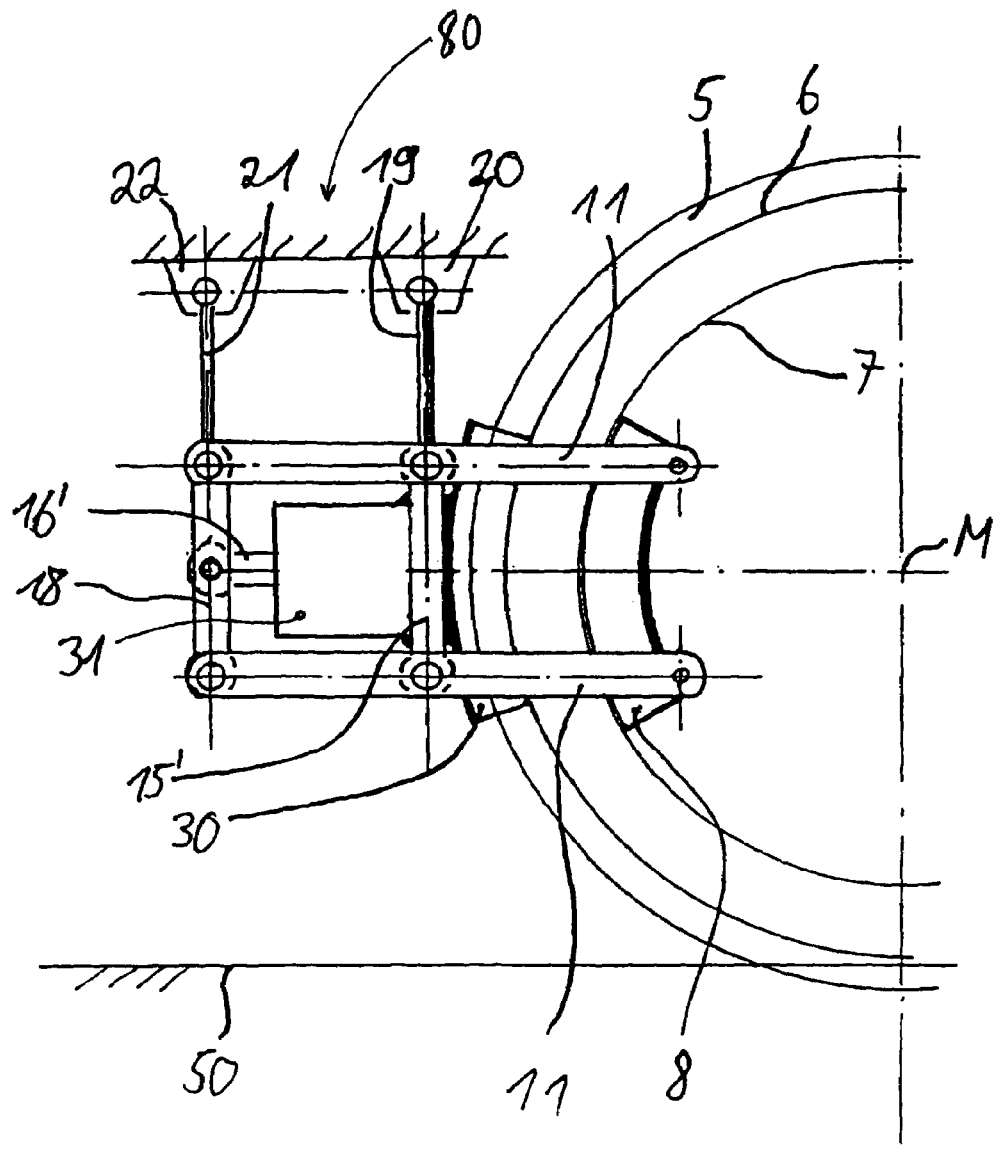
FIG. 5 is a lateral view of a shoe brake assembly, according to another embodiment of the present disclosure.

In the embodiment illustrated in FIG. 5, in addition to the brake pad 8' situated on the inside, a brake pad 30 situated on the outside is mounted on the suspension 20, 22. A mechanically, pneumatically or hydraulically acting cylinder 31 is mounted on a transverse lug 15', a piston rod force of the cylinder 31 acts on the brake pad 8' situated on the inside and a cylinder block reaction force acts upon the brake pad 30 situated on the outside. A pendulum suspension, including the transverse lugs 15' and 18 as well as the hanging lugs 19 and 21, takes place as in the embodiment of FIG. 2. As a result of the combination of a brake pad 8' situated on the inside and a brake pad 30 situated on the outside, performance of the shoe brake assembly is considerably increased. The two-sided arrangement of brake pads 8' and 30 provides a more uniform thermal heating of the wheel 4 during the braking operation so that thermal tensions are reduced.

Figure 6:
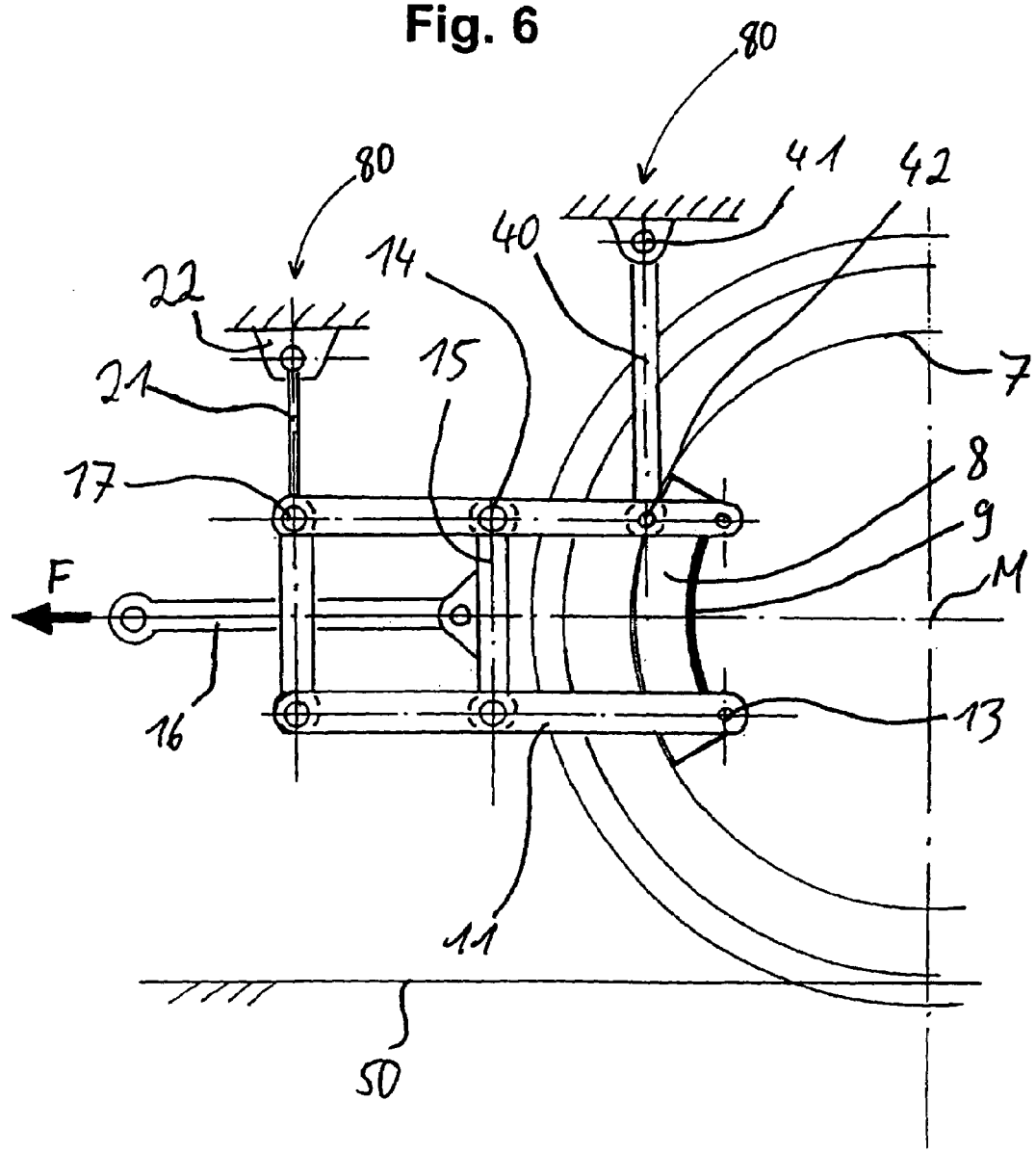
FIG. 6 is a lateral view of a shoe brake assembly, according to another embodiment of the present disclosure.

In the embodiment illustrated in FIG. 6, a brake pad 8 is provided on both sides of a wheel web 2, 2' (but not shown here). The brake pad 8 is situated on the inside and is held via two tension bows 11. Using the embodiment of FIGS. 1 to 3 for comparison, the holding lug 19, which was linked to the articulation 14 of the upper tension bow 11, is replaced by a separate holding lug 40 which is linked to one articulation 42 on the tension bow 11 and to another articulation 41 on the bogie 80. The articulation 42 is situation in the direct proximity of the brake pad 8, at least in the area of the wheel 4, so that a frictional force of the pad 8 can be introduced directly forward or into the holding lug 40. This possible stiffer linkage of the brake pad 8 will then result in lower braking noises during the operation.

Figure 7:
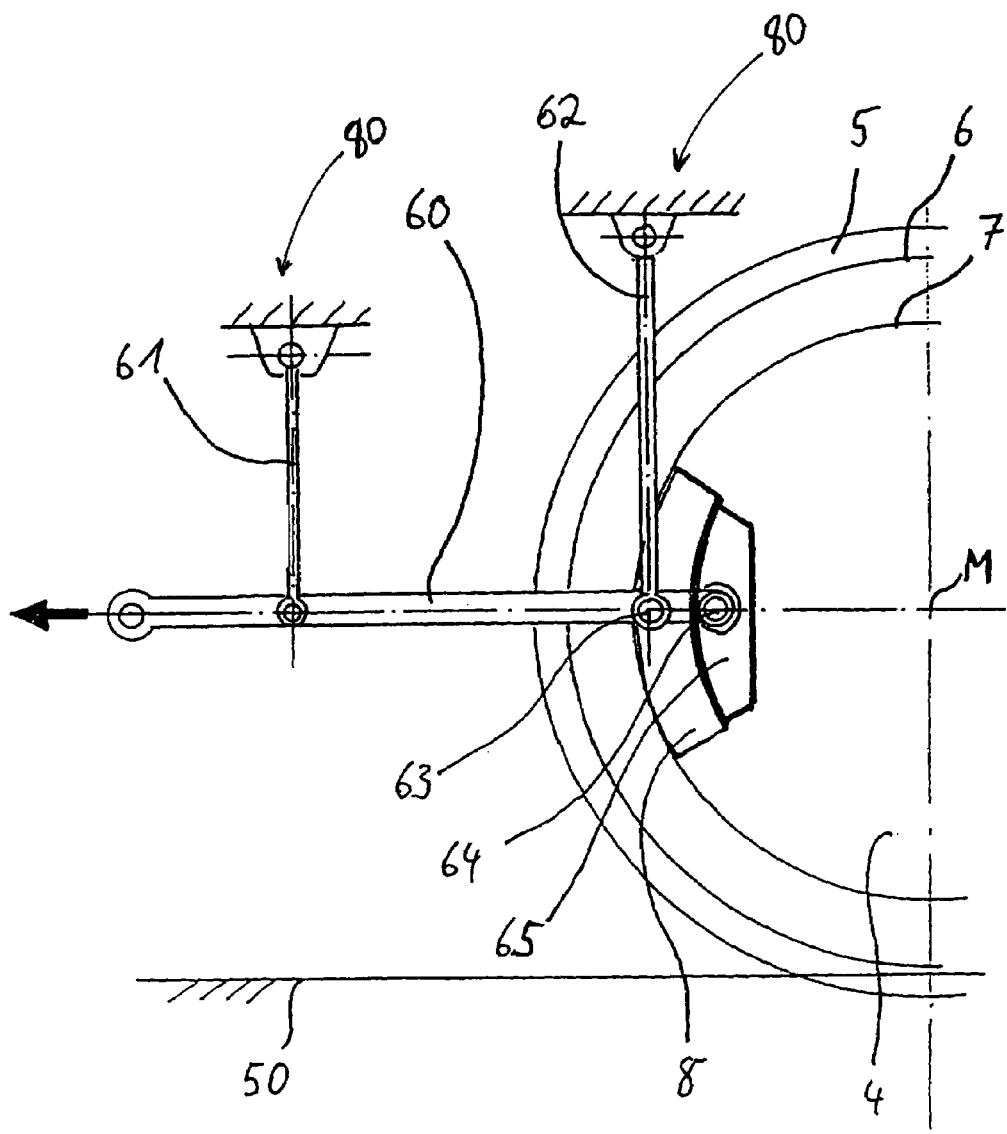
FIG. 7 is a lateral view of a shoe brake assembly, according to another embodiment of the present disclosure.

In FIG. 7, a brake pad 8 is disposed on the bogie 80 via a single linkage. For this purpose, a tension bow 60 is provided on one or both sides of the wheel 4, which tension bow 60 simultaneously forms a tension rod. The tension bow 60 is connected in an articulated manner with two holding lugs 61 and 62 which, in turn, are linked to the bogie 80, which is not shown in detail. At the end of the tension bow 60 facing the wheel 4, the tension bow 60 is connected via an articulation 64 with a pressure piece 65 which presses the brake pad 8 against the surface 7 of the wheel 4 during a braking operation. In this case, the holding lug 62 is linked to the tension bow 60 in the direct proximity of the brake pad 8.

In the embodiment illustrated in FIG. 8, the shoe brake assembly is mounted on the bogie 80 via a lever linkage. For generating a braking force, the brake pad 8 is pressed via a pressure piece 74 against the surface 7 on the wheel 4, the pressure piece 74 being movable via a tension bow 70 received at an end side in a cylinder 71. The cylinder 71 if fixed to the bogie 80 via a plate 72 and may operate in a hydraulic or pneumatic manner or be equipped with an operating mechanism. The pressure piece 74 is connected with a holding lug 75 by way of an articulation 73, which holding lug 75 is mounted on the bogie 80 via an articulation 76. Also in this embodiment, the holding lug 75 is linked in the direct proximity of the brake pad 8.

Features of the illustrated embodiments can be combined with one another in order to create other embodiments of the shoe brake assembly, according to the principles of the present disclosure. For example, the sloped arrangement of the braking surfaces can also be used in the embodiments of FIGS. 5 and 6. Furthermore, it is conceivable to design the suspension of the brake pad 8 in a different manner and to cause the operation of the brake pad 8 via a known lever mechanism.

Although the present disclosure has been described and illustrated in detail, it is to be clearly understood that this is done by way of illustration and example only and is not to be taken by way of limitation. The spirit and scope of the present disclosure are to be limited only by the terms of the appended claims.

The invention claimed is:

1. A shoe brake assembly for rail vehicles, comprising:
a bogie connected with the rail vehicle;
a wheel having a wheel web and radially inward-facing surfaces adjacent opposite sides of the wheel web;
at least two brake pads located adjacent the respective radially inward-facing surfaces of the wheel;
a pendulum suspension arrangement connecting the at least two brake pads to the bogie;
an operating device configured to move the at least two brake pads via the pendulum suspension arrangement essentially radially against respective radially inward-facing surfaces of the wheel;
wherein a tension bow connected with each of the brake pads is connected in an articulated manner with the bogie by a holding lug; and
wherein at least one articulation of the holding lugs is aligned with an articulation of a transverse lug connected with the tension bows.

2. The shoe brake assembly according to claim 1, wherein the inwardly-facing surfaces are constructed on a wheel flange and are sloped toward the wheel web.

3. The shoe brake assembly according to claim 2, further including tension bows, and when a force is introduced by the tension bows a normal force is generated between the brake pads and the radially inward-facing surfaces, and an axially acting braking force is generated between a section of the wheel web and the brake pads.

4. The shoe brake assembly according to claim 1, wherein the at least two brake pads are connected to two tension bows.

5. The shoe brake assembly according to claim 4, wherein the tension bows are mutually connected in an articulated manner by transverse lugs, and are mutually displaceable in a parallelogram-type manner.

6. The shoe brake assembly according to claim 1, wherein two spaced-apart holding lugs are connected with the tension bows and the bogie.

7. The shoe brake assembly according to claim 1, wherein each of the holding lugs is connected with the tension bows in direct proximity to each of the at least two brake pads.

8. The shoe brake assembly according to claim 1, wherein the suspension arrangement includes a tension bow connected with each of the at least two brake pads by a pressure piece.

9. The shoe brake assembly according to claim 1, wherein for an application of the brake pads, a tension bow is provided which is linked to the bogie by two holding lugs.

10. The shoe brake assembly according to claim 1, wherein the suspension arrangement is one of hydraulically, pneumatically and mechanically operated by a tension bow.

11. The shoe brake assembly according to claim 1, wherein at least two other brake pads are included with the suspension arrangement, which brake pads are movable against a tread of the wheel.

12. The shoe brake assembly according to claim 1, further including two brake pads placable against the radially inward-facing surfaces of two adjacent wheels.

13. The shoe brake assembly according to claim 1, wherein the inwardly-facing surfaces of the wheel and an opposite surface of the brake pads are constructed in a sloped manner toward the wheel web.

14. The shoe brake assembly according to claim 13, wherein the brake pads are movable against a section of the wheel web to generate a braking force.

15. The shoe brake assembly according to claim 1, wherein the brake pads include an elastic friction surface.

16. The shoe brake assembly according to claim 15, wherein the brake pads include several friction elements which are each prestressed toward the friction surface by a spring.

\* \* \* \* \*